(12) United States Patent
Shigeta et al.

(10) Patent No.: US 7,097,934 B2
(45) Date of Patent: Aug. 29, 2006

(54) BATTERY APPARATUS FOR VEHICLE

(75) Inventors: Naohiro Shigeta, Kasai (JP); Masaki Yugo, Kakogawa (JP); Tetsu Miyamoto, Kasai (JP); Shoichi Toya, Kasai (JP); Hideo Shimizu, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 611 days.

(21) Appl. No.: 10/352,159

(22) Filed: Jan. 28, 2003

(65) Prior Publication Data
US 2003/0162084 A1    Aug. 28, 2003

(30) Foreign Application Priority Data
Jan. 30, 2002 (JP) .............................. 2002-022509
Jan. 31, 2002 (JP) .............................. 2002-024803

(51) Int. Cl.
*H01M 2/12* (2006.01)
*H01M 10/50* (2006.01)

(52) U.S. Cl. ................ 429/62; 429/7; 429/61
(58) Field of Classification Search ............... 429/7, 429/61, 62, 72, 83, 90, 120, 156
See application file for complete search history.

(56) References Cited

U.S. PATENT DOCUMENTS

2003/0134189 A1 * 7/2003 Kanai et al. ................ 429/156

* cited by examiner

*Primary Examiner*—Michael Barr
*Assistant Examiner*—Monique Wills
(74) *Attorney, Agent, or Firm*—Wenderoth, Lind & Ponack, L.L.P.

(57) ABSTRACT

In the present battery apparatus for a vehicle, a temperature detecting plate 30 is fixed outside a casing 10 accommodating a plurality of secondary batteries 20. The casing 10 is provided with ventilation holes 15 for cooling the secondary batteries 20 between the secondary batteries 20 and the temperature detecting plate 30. The temperature detecting plate 30 fixes temperature sensors 50 on an insulation substrate 31. The insulation substrate 31 has air holes 33 communicated with the ventilation holes 15 of the casing 10, and a communicating portion 34 is provided between the air holes 33. The temperature sensor 50 is fixed to the communicating portion 34, and thereby the temperature sensor 50 is located so as to have access to a surface of the secondary battery 20 via the ventilation hole 15.

25 Claims, 11 Drawing Sheets

BATTERY APPARATUS FOR VEHICLE

This application is based on Application No. 2002-24803 filed in Japan on Jan. 31, 2002, No. 2002-22509 filed in Japan on Jan. 30, 2002, the contents of which are incorporated hereinto by reference.

BACKGROUND OF THE INVENTION

The present invention relates to a battery apparatus for driving a motor that drives a vehicle such as automobile, and more particularly to a battery apparatus including a temperature sensor for detecting the temperature of the battery.

Since a battery apparatus for automobile is charged and discharged with large amounts of current, the temperature of the secondary battery may rise to relatively high depending on the condition of use. For this reason, it is necessary to detect the temperature of the secondary battery for controlling the charging and discharging. For achieving this, conventional battery apparatuses for vehicle have a PTC which serves as a temperature sensor attached to the surface of a battery module made up of serially connected secondary batteries. In the PTC, when the temperature of the battery exceeds a preset temperature, electric resistance thereof dramatically increases. The PTC is attached to the surface of each secondary battery, and serially connected with each other. The above battery module draws a lead wire for the temperature sensors connected with the PTCs.

The temperature sensor such as PTC fixed to the surface of the battery module is able to detect the secondary battery with accuracy. However, in the process of producing the battery module, a temperature sensor is fixed to the surface of every secondary battery, and lead wires of the respective temperature sensors are connected in serial, resulting in a drawback that the production of the battery module takes a lot of labor. In addition, since the temperature sensors are fixed to the battery module, the cost for producing the battery module increases. In addition, the battery module needs to be replaced when the secondary battery breaks down. At this time, it is impossible to replace only the secondary battery, but the temperature sensor should be replaced together, which leads a drawback that the repairing cost increases.

This drawback can be eliminated by disposing a temperature sensor to a casing which fixes the battery module. However, it takes a lot of labor to dispose a temperature sensor to a casing which accommodates a plurality of battery modules so as to enable accurate detection of the temperature of each secondary battery. Furthermore, there is another drawback that it is difficult to allow each temperature sensor to access to the surface of the secondary battery with accuracy.

The present invention was devised to solve the above-mentioned drawbacks. It is an important object of the present invention to provide a battery apparatus for vehicle in which a plurality of temperature sensors can be disposed in close to the respective secondary batteries so that accurate detection of temperature can be achieved readily and easily.

SUMMARY OF INVENTION

The battery apparatus for vehicle of the present invention comprises a plurality of secondary batteries; a casing accommodating the secondary batteries; and a temperature detecting plate fixed outside the casing and connecting temperature sensors for detecting temperatures of the secondary batteries accommodated in the casing. The casing has ventilation holes passing therethrough for cooling the secondary batteries in the casing and disposed in the part between the secondary batteries and the temperature detecting plate. The temperature detecting plate fixes the temperature sensors to an insulation substrate. The insulation substrate has air holes communicating with the ventilation holes of the casing. The insulation substrate also has a communicating portion between the air holes for connecting the temperature sensor, and the temperature sensor is fixed to the communicating portion. The battery apparatus allows the temperature sensor of the temperature detecting plate to access to the surface of the secondary battery via the ventilation hole of the casing.

The battery apparatus for vehicle described above has an advantage that it is possible to dispose the plurality temperature sensors in close to the secondary batteries in a simple and easy manner while enabling accurate detection of temperature. This is because the battery apparatus includes a temperature detecting plate which fixes the temperature sensors to the insulation substrate and disposed outside the casing accommodating the plurality of secondary batteries, and the temperature sensors are allowed to access to the surfaces of the secondary batteries via the ventilation holes provided in the casing between the secondary batteries and the temperature detecting plate. According to the present battery apparatus, since the temperature sensors fixed to the insulation substrate are disposed in the ventilation holes of the casing and accessed to the surfaces of the secondary batteries, it is possible to readily dispose the temperature sensors so as to detect the temperatures of the secondary batteries. In particular, the structure of fixing the temperature sensors to the insulation substrate has an advantage that the wiring of the temperature sensors can be simplified, and that the temperature sensors can be fixed while being positioned accurately.

In addition, since the aforementioned battery apparatus does not fix a temperature sensor to the surface of a secondary battery as is the conventional case, advantages arise that it is possible to reduce the production cost by facilitating the production of the battery module, and that even when the secondary battery breaks, it is possible to replace only the secondary battery without replacing the temperature sensor, and hence the repairing cost can be reduced.

In addition, in the aforementioned battery apparatus, since the insulation substrate of the temperature detecting plate is provided with the air holes communicated with the ventilation holes of the casing, and the temperature sensor is fixed to the communicating portion provided between these air holes, it is possible to cool the secondary batteries while allowing air passage through the air holes and the ventilation holes without causing blockage of the ventilation holes of the casing by the temperature detecting plate.

The battery apparatus may be such that a battery module made up of a plurality of secondary batteries connected in serial is accommodated in the casing, and the ventilation holes and the air holes are provided in parallel with the battery module. In this case, the temperature detecting plate may be such that the communicating portion is disposed so as to oppose to the secondary battery of the battery module, and temperature of one secondary battery is detected by one temperature sensor disposed to this communicating portion. Furthermore, the temperature detecting plate may be such that the communicating portion is disposed to a secondary battery connecting portion of the battery module, and temperatures of two secondary batteries are detected by one temperature sensor disposed to this communicating portion.

The insulation substrate of the temperature detecting plate may be a printed substrate. The present insulation substrate implemented by a printed substrate makes it possible to wire the plurality of temperature sensors very easily. Furthermore, the temperature detecting plate can fix the heaters for heating the secondary batteries.

The above and further objects and features of the invention will more fully be apparent from the following detailed description with accompanying drawings.

DETAILED DESCRIPTION OF THE INVENTION

Figure 1:
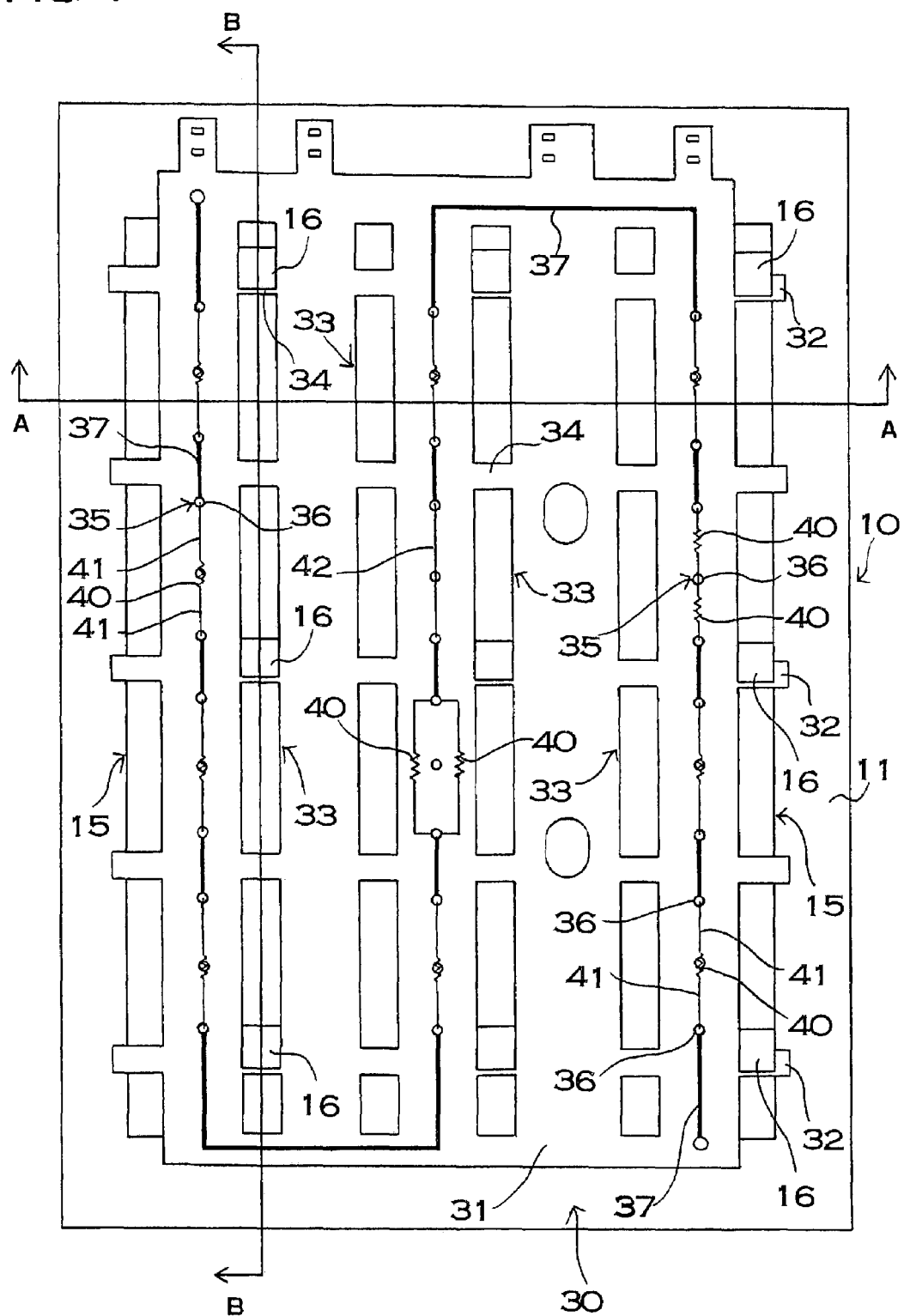
FIG. 1 is a plan view of a battery apparatus according to the first embodiment of the present invention.
Figure 2:
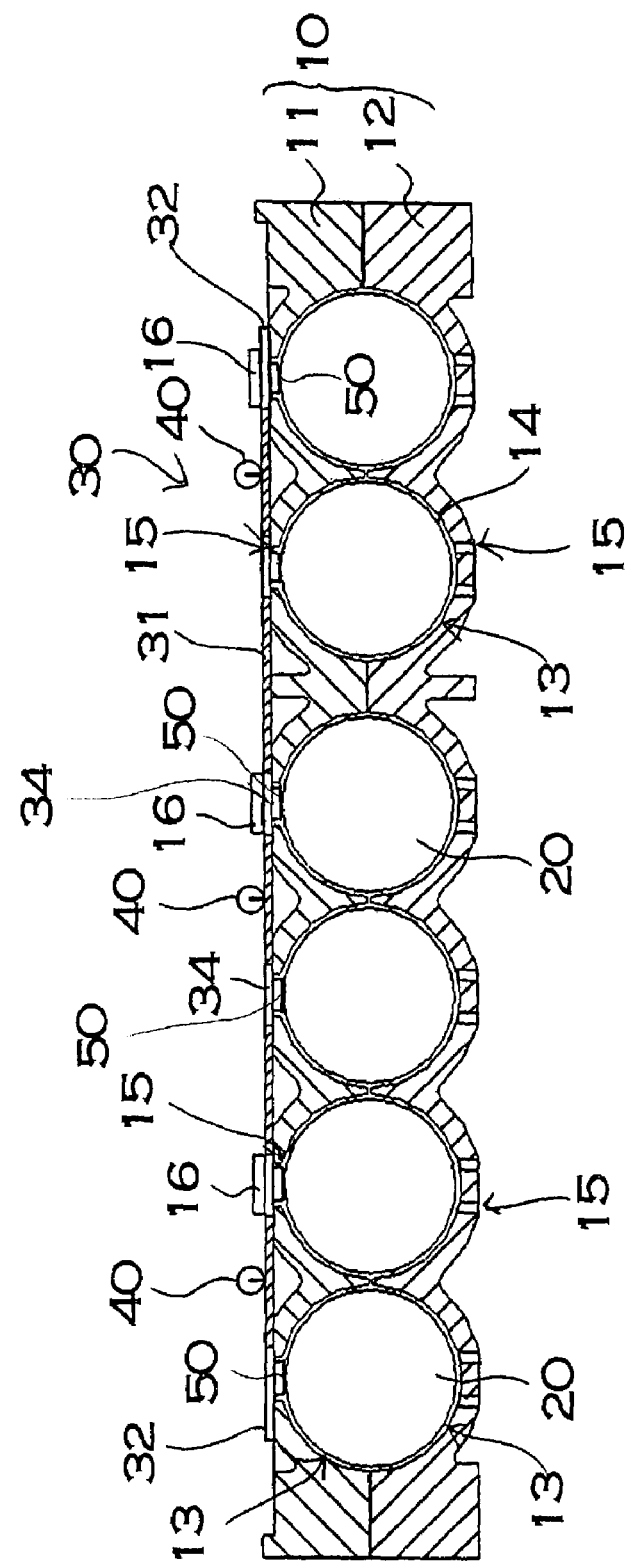
FIG. 2 is a sectional view along the line A—A of the battery apparatus shown in FIG. 1.
Figure 3:
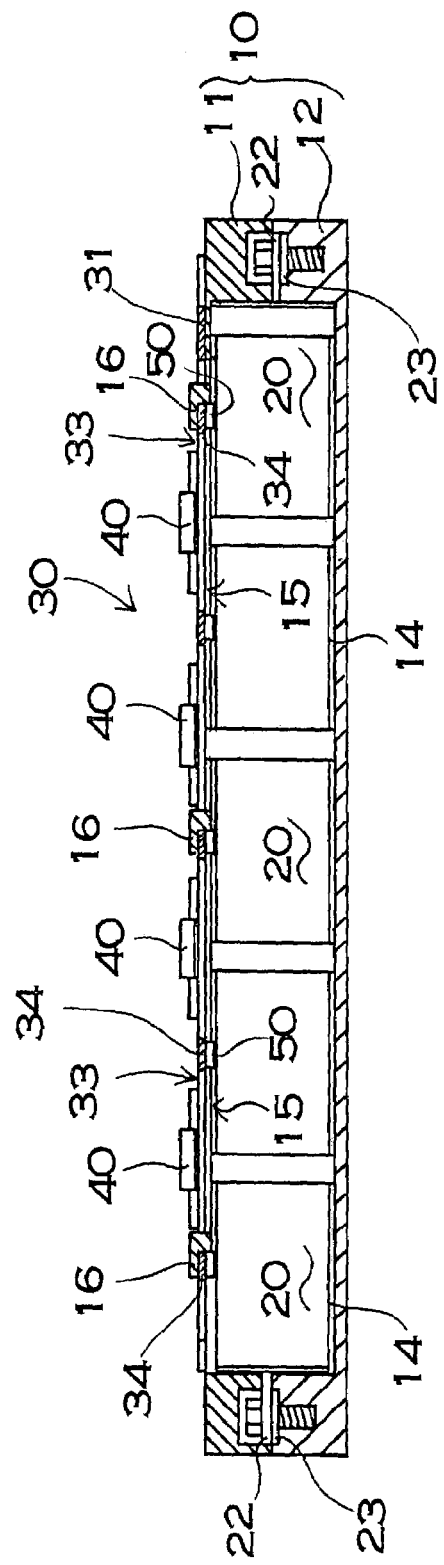
FIG. 3 is a sectional view along the line B—B of the battery apparatus shown in FIG. 1.
Figure 4:
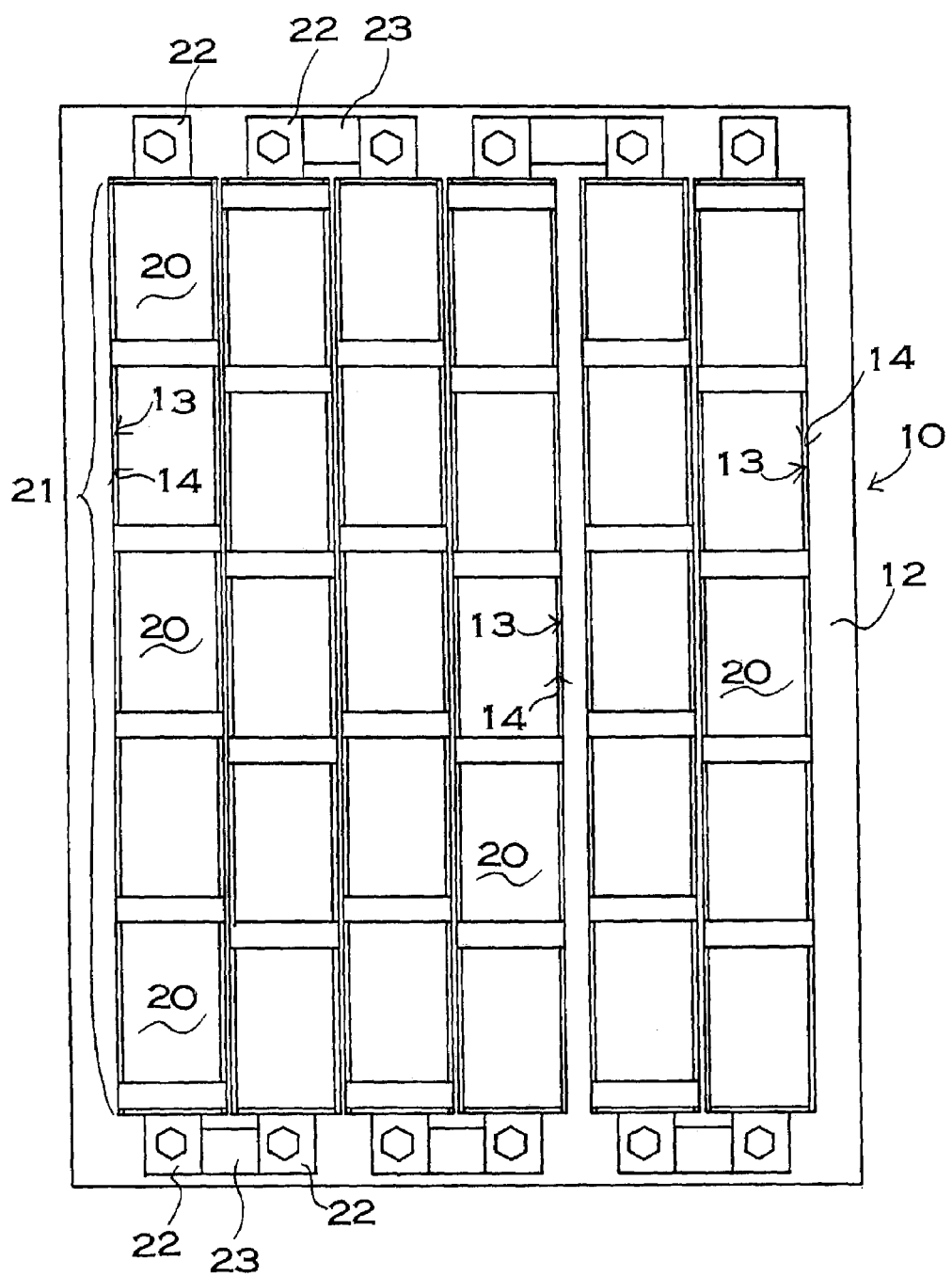
FIG. 4 is a plan view showing the battery apparatus shown in FIG. 1 in an open state of the casing.

FIGS. 1 to 4 show a battery apparatus according to one embodiment of the present invention. FIG. 1 is a plan view, FIG. 2 is a transverse sectional view, FIG. 3 is a longitudinal sectional view, and FIG. 4 is a plan view of an open state of the casing. This battery apparatus includes a plurality of secondary batteries 20, a casing 10 accommodating the secondary batteries 20, and a temperature detecting plate 30 fixed outside the casing 10, and connecting temperature sensors 50 for detecting temperatures of the secondary batteries 20 accommodated in the casing 10. The casing 10 accommodates the plurality of secondary batteries 20 arranged in parallel. In the illustrated battery apparatus, the secondary batteries are accommodated in the casing 10 in the form of a plurality of battery modules 21. The battery module 21 is made up of a plurality of secondary batteries 20 connected in series and linearly connected with each other. The secondary battery 20 constituting the battery module 21 is a cylindrical nickel-hydrogen battery. It is to be noted that the secondary battery may be other types of battery which are chargeable such as lithium-ion secondary battery and nickel-cadmium battery. Also square batteries may be used instead of the cylindrical batteries.

The casing 10 accommodates a plurality of battery modules 21 on the same plane and in parallel with each other. The battery modules 21 laid in a traverse direction are serially connected with each other for improving the output voltage. The illustrated casing 10 accommodates the battery modules 21 between a first casing portion 11 and a second casing portion 12. The first casing portion 11 and the second casing portion 12 provide guiding grooves 13 for guiding the battery modules 21. The guiding groove 13 is so designed that the inside profile thereof is slightly larger than the outer shape of the battery module 21. In the casing 10, an air-blowing space 14 for allowing the air to pass is formed between the inner surface of the guiding groove 13 and the surface of the battery module 21. Furthermore, the first casing portion 11 and the second casing portion 12 form a ventilation hole 15 in the bottom of the guiding groove 13. The cooling air passing through the air-blowing space 14 flows on the surface of the battery module 21 to cool the battery module 21. The ventilation hole 15 has a slit-like shape. The slit-like ventilation hole 15 connects between each secondary battery 20 constituting the battery module 21, and the opening thereof extends to almost both ends of the secondary battery 20.

Figure 5:
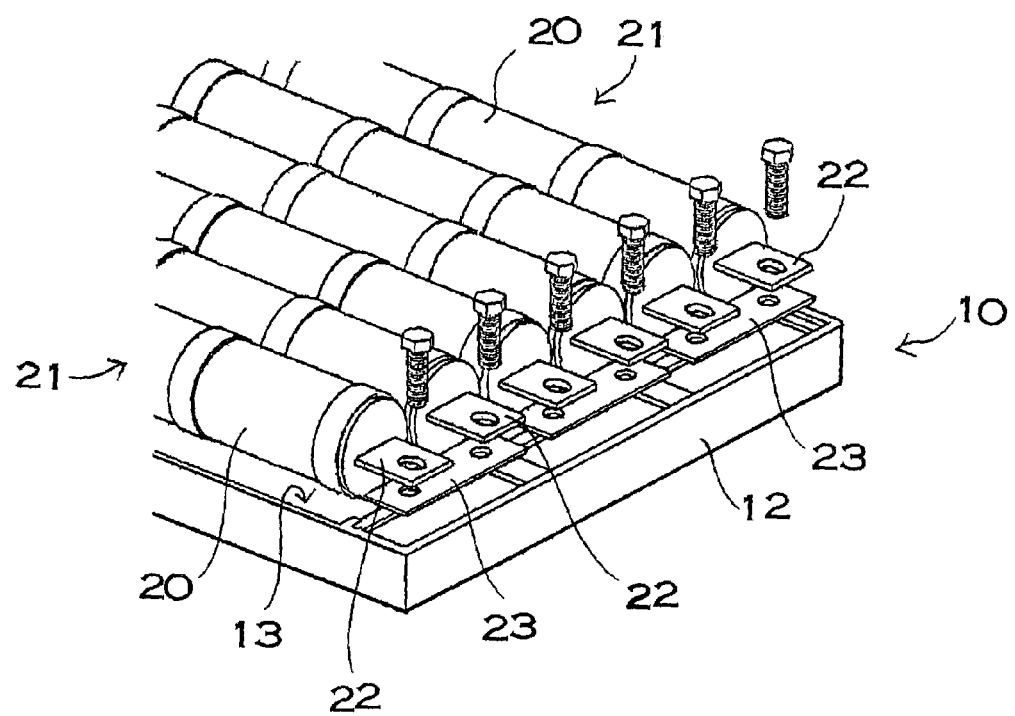
FIG. 5 is an exploded perspective view showing a state in which battery modules are accommodated in a casing.

The battery module 21 is fixed to the casing 10 at both ends thereof, and disposed at a distance from the inner surface of the guiding groove 13. The battery module 21 is fixed with terminals 22 to be connected to the casing 10 protruding from both end surfaces of the battery. This structure is shown in FIG. 5. The battery module 21 shown in FIG. 5 fixes the terminal 22 so as to be perpendicular to the end surfaces of the battery. The terminal 22 is fixed by screwing to a bus bar 23 to be fitted in a predetermined position of the second casing portion 12. This bus bar 23 connects the neighboring battery modules 21 with each other, while electrically connecting the battery modules 21 in series. The bus bar 23 and the terminal 22 are sandwiched between the second casing portion 12 and the first casing portion 11 and fixed in a predetermined position. The battery module 21 is disposed in the guiding groove 13 via the terminal 22. The battery module 21 is fixed to the casing 10 while leaving the air-blowing space 14 which allows passage of air with respect to the inner surface of the guiding groove 13. With this structure, the air flowing into the casing 10 from the ventilation hole 15 can pass through the air-blowing space 14 and efficiently come into contact with the surface of the battery module 21 for achieving heat conversion.

As shown in FIGS. 1 to 3, in the battery apparatus, the temperature detecting plate 30 is fixed outside the casing 10 which accommodates the secondary batteries 20. In the illustrated battery apparatus, the second casing portion 12 is disposed on a lower side and the first casing portion 11 is disposed on an upper side in the drawing, and the temperature detecting plate 30 is fixed on the top surface of the casing 10. In this battery apparatus, the casing surface of the first casing portion 11 is disposed between the secondary batteries 20 accommodated in the casing 10 and the temperature detecting plate 30. It is to be noted that as a vertically inverted position from the above-described position, the second casing portion may be disposed on the upper side and the first casing portion may be disposed on the lower side, and the temperature detecting plate may be fixed on the bottom surface of the casing in which secondary batteries are accommodated.

The temperature detecting plate 30 fixes the temperature sensors 50 for detecting the temperatures of the secondary batteries 20 accommodated in the casing 10 on an insulation substrate 31. The temperature sensor 50 is implemented, for example, by a PTC. The PTC has such a characteristic that when the temperature of battery rises to a preset temperature or higher, the electric resistance thereof dramatically increases. Accordingly, a rise in temperature of the battery can be detected from a change in resistance value. The temperature sensors 50, which are PTCs, are fixed to the insulation substrate 31 and connected in series with each other. As described above, the temperature sensors 50 fixed to the insulation substrate 31 provide an advantage of extremely easy wiring. The temperature sensors 50 are provided so as to protrude from the insulation substrate 31 and access the secondary batteries 20 accommodated in the casing 10 via the ventilation holes 15. In the illustrated battery apparatus, the ventilation holes 15 are open so as to penetrate through the first casing portion 11, and also the insulation substrate 31 of the temperature detecting plate 30 is provided with air holes 33 so as to communicate with the ventilation holes of the casing 10. The ventilation hole 15 and the air hole 33 are located so as to oppose each other in same position, and the temperature detecting plate 30 is arranged so as not to close the ventilation holes 15. The air passes through the air holes 33 and the ventilation holes 15 to cool the secondary batteries in the casing 10.

For fixing the temperature sensors 50, the insulation substrate 31 is provided with a communicating portion 34 between the air holes 33. That is, the communicating portion 34 is provided so as to bridge between the slit-like air holes 33. The temperature sensor 50 thus fixed to the communicating portion 34 is protruded into the ventilation hole 15 of the casing 10, as shown in the sectional perspective view of FIG. 6, and has access to the surface of the secondary battery 20. In the temperature detecting plate 30 shown in FIG. 2, the communicating portion 34 is disposed at a position opposing to the secondary battery 20 of the battery module 21, and the temperature of one of the secondary batteries 20 is detected by means of one temperature sensor 50 disposed at this communicating portion 34. This temperature detecting plate 30 has an advantage that the temperature of each secondary battery 20 can be detected with accuracy.

Figure 7:
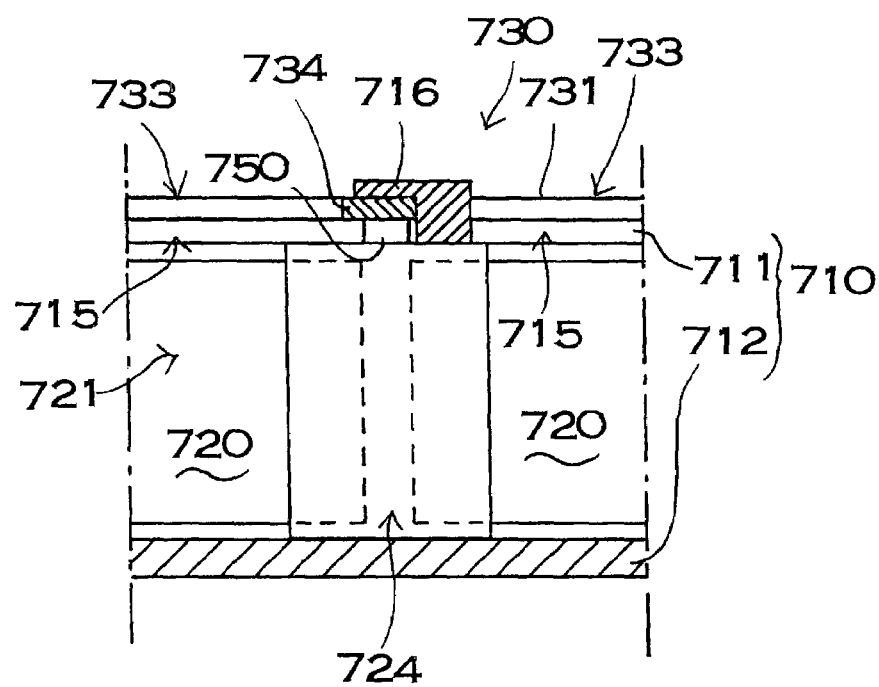
FIG. 7 is an enlarged sectional view showing an essential part of a battery apparatus according to another embodiment of the present invention.

As an alternative, a temperature detecting plate 730 as shown in FIG. 7 is also possible in which a communicating portion 734 is disposed to a secondary battery connecting portion 724 of a battery module 721, and the temperatures of two secondary batteries 720 are detected by one temperature sensor 750 disposed to this communicating portion 734. This structure can reduce the number of the temperature sensors 750 to one half the number of the secondary batteries 720. Furthermore, in accordance with this structure, since the communicating portion 734 is disposed to the secondary battery connecting portion 724 of the battery module 721, it is possible to open an air hole 733 along almost the entirety of the secondary battery 720. Accordingly, an advantage arises that the secondary battery 720 can be efficiently cooled by the air hole 733. In this embodiment, the same constituent as in the previous embodiment is denoted by the same reference numeral regarding the last two digits except for the first digit.

Figure 6:
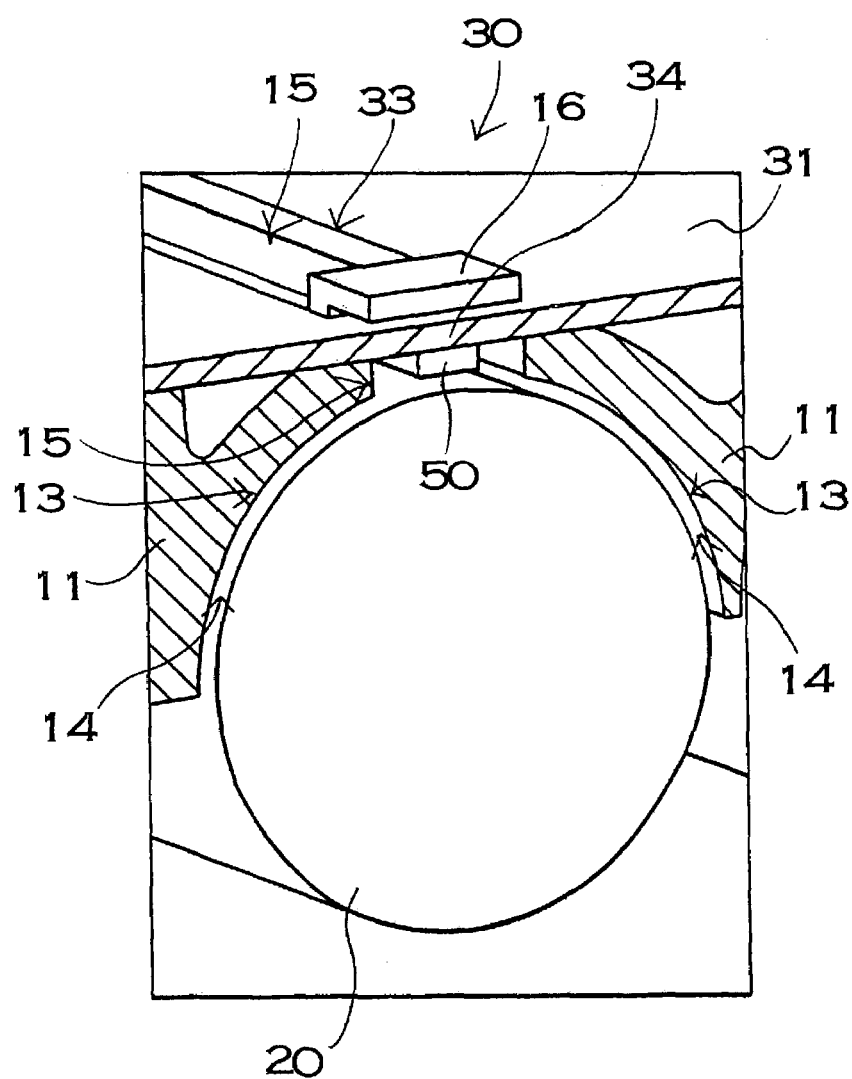
FIG. 6 is a sectional perspective view showing a connecting structure between a temperature detecting plate and a casing.

As shown in the plan view of FIG. 1, the temperature detecting plate 30 is provided with a projection 32 at its periphery so as to connect and fix its circumference to the casing 10. As shown in FIGS. 3 and 6, the casing 10 is provided with a latch hook 16 which is integrally formed to latch the projection 32 of the temperature detecting plate 30 with the communicating portion 34. The latch hook 16 has an opening in the traverse direction so that it can latch the temperature detecting plate 30 with a deviation in the horizontal direction. The latch hook 16 is so structured that the temperature detecting plate 30 can be latched with a deviation in the longitudinal direction of the slit-like air hole 33. The temperature detecting plate 30, connected to the casing 10 by means of the latch hook 16, can press the temperature sensor 50 onto the surface of the secondary battery 20. This is because the latch hook 6 holds the temperature detecting plate 30 so as not to leave the casing 10.

The illustrate temperature detecting plate 30 fixes a plurality of heaters 40 on its surface. The heaters 40 heat the secondary batteries 20 in extremely cold conditions. The heaters 40 heat the air, and then the air thus heated passes through the air holes 33 and the ventilation holes 15 to heat the secondary batteries 20 within the casing 10.

The illustrated battery apparatus fixes the temperature detecting plate 30 on the top surface of the casing 10. This battery apparatus allows the air heated by the temperature detecting plate 30 to naturally circulate in the casing 10 to thereby heat the secondary batteries 20. Although not shown in the drawing, in a battery apparatus which is vertically inverted from the position of FIG. 2 and wherein the temperature detecting plate is fixed on the bottom surface of the casing, the air heated by the temperature detecting plate becomes light and passes through the air holes and the ventilation holes to be flown into the air-blowing space, so that the second batteries can be heated more efficiently. Alternatively, the battery apparatus of the present invention may heat the secondary batteries by blowing the air heated by the heaters of the temperature detecting plate by means of a fan (not shown). The battery apparatus of the type that blows heated air by means of a fan circulate the heated air in the closed loop, so that the secondary batteries can be heated efficiently. A battery apparatus is not always mounted on an automobile in the horizontal position. A battery apparatus is sometimes mounted on an automobile in the vertical or inclined position. The battery apparatus of the type that circulates the air heated by the temperature detecting plate can effectively heat the secondary batteries regardless of the position in which it is mounted on the automobile.

The temperature detecting plate 30 fixes the plurality of heaters 40 to the insulation substrate 31 in the condition that they are connected in serial. The heater 40 is an electronic component such as resistance, semiconductor and PTC that generates heat upon energization. The temperature detecting plate 30 energizes the heater 40 to heat each of the heaters 40 by Joule heat, and heats the secondary batteries 20 by the heat generated by the heaters 40.

In the temperature detecting plate 30, the slit-like air holes 33 passing through the insulation substrate 31 are provided, and the heater 40 is fixed between the air holes 33. The air holes 33 are disposed at positions opposing to the ventilation holes 15 in the condition that the insulation substrate 31 is fixed to the first casing 11. On the insulation substrate 31, the plurality of heaters are fixed so as to heat the secondary batteries 20.

The insulation substrate 31 is implemented by a printed substrate and provided with a plurality of connecting holes 35 so that the lead wires 41 of the heaters 40 are inserted therein to be soldered thereto. The connecting hole 35 is provided with a conductive ring 36 on its periphery. The conductive ring 36 of the connecting hole 35 does not establish electrical connection in the portion where the heater 40 is fixed, but establishes electrical connection via a conductive wire 37 fixed on the surface of the printed substrate in the portion where the heater 40 is not fixed. The heater 40 is fixed to the insulation substrate 31 by inserting the lead wire 41 of each end into the connecting hole 35 of the insulation substrate 31 and soldering the lead wire 41 to the conductive ring 36.

The heaters 40 are soldered to the connecting holes 35 and connected with each other in serial. All the heaters 40 soldered and fixed to the printed substrate have the same resistance value. When the heaters 40 of the same resistance value connected in serial are energized, the calorific value is the same among all the heaters 40. This is because the calorific value is in proportion to the product of the square of electric current and the resistance value. The temperature detecting plate 30 for heating the plurality of secondary batteries 20 is not necessarily able to uniformly heat all the secondary batteries 20 by heating uniformly. This is because, for example, the battery module 20 in the circumferential part of the casing 10 would likely to be cooled compared to the battery module 21 in the center part of the casing.

It is important for the temperature detecting plate 30 to heat all the secondary batteries 20 more uniformly rather than to uniformly generate heat in the entire plate.

The temperature detecting plate 30 shown in FIG. 1 enables local adjustment of heat generation by adjusting the number of heaters 40 to be connected in parallel or connecting a jumper cable 42 instead of the heater 40. This is because the calorific value of resistance can be defined by the product of the square of current and the resistance value. Accordingly, it is possible to prevent heat generation by connecting the jumper cable 42 instead of the heater 40, for example. Since the resistance of the jumper cable 42 is 0Ω, heat is not generated even if the current is applied. Also, the calorific value can be adjusted by adjusting the number of heaters 40 to be connected in parallel to the heaters 40 connected in serial. For example, two heaters 40 may be connected in parallel at the portion where a heater 40 is to be fixed, thereby reducing the calorific value to half. This is because by connecting the heaters 40 in parallel, the resistance value of the heater 40 can be reduced to half. Also three heaters may be connected in parallel at the portion where the heater 40 is to be fixed, thereby reducing the calorific value to one third. Further, two heaters 40 may be connected in serial at the portion where the heater 40 is to be fixed, thereby doubling the resistance value to enhance the calorific value twice. In the illustrated temperature detecting plate 30, two heaters 40 are connected in serial in side part for enhancing the calorific value, while the jumper cable 42 is connected instead of the heater 40 in center part for reducing the calorific value, whereby the calorific value of the temperature detecting plate 30 is locally adjusted to enable uniform heating of the plurality of secondary batteries 20. Alternatively, the temperature may be adjusted by changing the resistance value of the heater rather than using heaters of the same resistance value.

Figure 8:
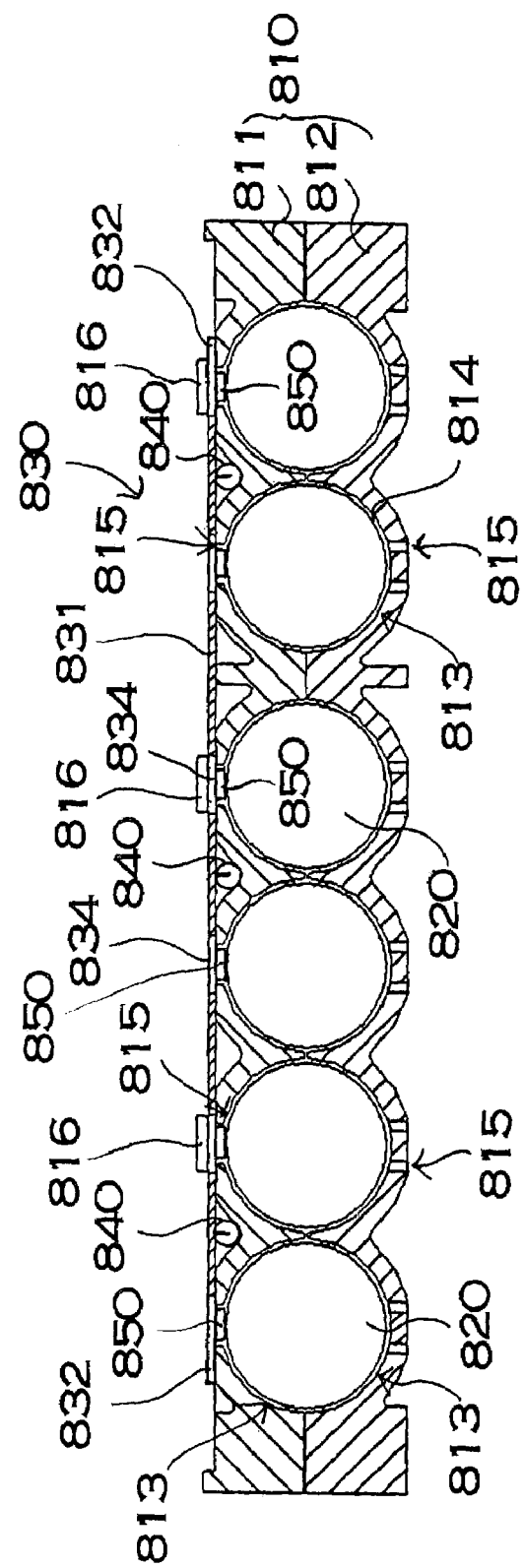
FIG. 8 is a transverse sectional view of a battery apparatus according to a further embodiment of the present invention.

As an alternative, a temperature detecting plate 830 as shown in FIG. 8 is also possible in which a heater 840 is fixed on the surface opposing to a secondary battery 820. The heater 840 disposed herein heats a first casing 811 and the first casing 811 heats the secondary battery 820. In the illustrated first casing 811, the inner surface of a guiding groove 813 is shaped so as to follow the surface of the secondary battery 820. The first casing 811 heated by the heater 840 heats the secondary battery 820 by the radiant heat, or heats the secondary battery 820 via the air in an air-blowing space 814. The battery apparatus having such a structure can be mounted on an automobile in vertical position without using a fan, or can be mounted on an automobile in a position vertically inverted from the illustrated position to heat the secondary batteries by the temperature detecting plate. In the embodiment illustrated in this drawing, the same constituent as in the previous embodiment is denoted by the same reference numeral regarding the last two digits except for the first digit.

Figure 9:
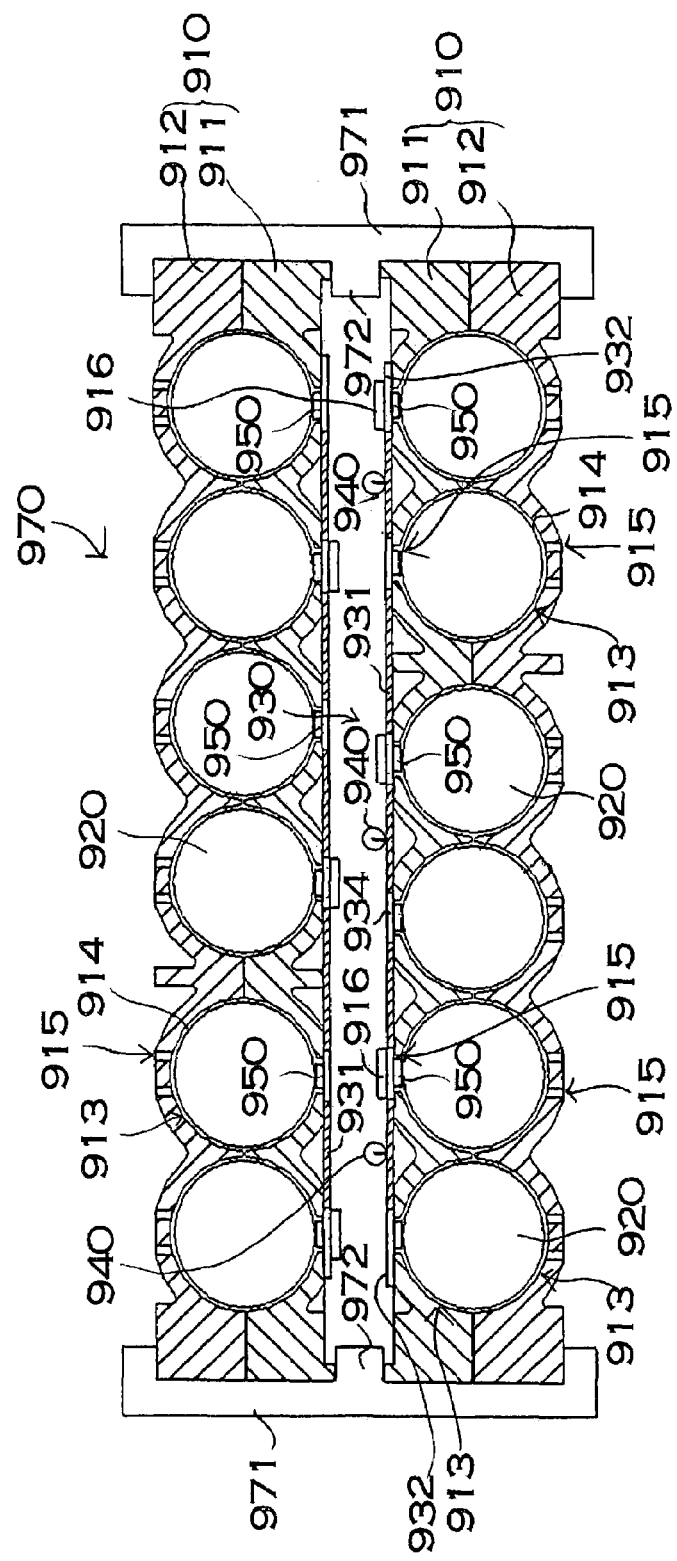
FIG. 9 is a traverse sectional view of a battery apparatus according to a further embodiment of the present invention.

Furthermore, in the battery apparatus shown in FIG. 9, a casing 910 accommodating secondary batteries 920 is regarded as one casing unit 970, and two casing units 970 are piled and connected with each other. In FIG. 9, the lower casing unit 970 has the same structure as that of the battery apparatus shown in FIG. 2, while the upper casing unit 970 is identical to the battery apparatus shown in FIG. 2 which is vertically inverted. Therefore, in the embodiment shown in FIG. 9, the same constituent as in the previous embodiment is denoted by the same reference numeral regarding the last two digits except for the first digit, and explanation thereof will be omitted.

In this battery apparatus, two casing units 970 are piled and connected in such a position that respective temperature detecting plates 930 are opposed to each other. These two casing units 970 are connected by an outer casing 971. The illustrated outer casing 971 has a positioning projection 972 in the middle part thereof so as to connect the two casing units 970 at a predetermined distance. The outer casing 971 determines the thickness of the positioning projection 972 so that the distance between the two casing units 970 is optimum.

Furthermore, in the illustrated battery apparatus, the temperature detecting plate 930 of the upper casing unit 970 is not provided with a heater 940. Secondary batteries 920 accommodated in the upper casing unit 970 are heated by the heaters 940 fixed to the temperature detecting plate 930 of the lower casing unit 970. Such type of battery apparatus wherein the heaters 940 are disposed to either one temperature detecting plate 930 has an advantage that a plural number of secondary batteries 920 can be efficiently heated with a reduced number of heaters 940, namely with small power consumption. In particular, in the structure that the heaters 940 are disposed to the lower temperature detecting plate 930, the secondary batteries 920 accommodated in the lower casing unit 970 are efficiently heated by the heat transferred to the first casing 911 from the lower temperature detecting plate 930, and the secondary batteries 920 accommodated in the upper casing unit 970 are efficiently heated by circulating the air that is heated and lightened, from air holes 933 and ventilation holes 934. Therefore, all of the secondary batteries can be efficiently and uniformly heated with small power consumption. It is to be noted that the heaters may be disposed to the temperature detecting plate of the upper casing unit, or may be disposed to both of the upper and the lower temperature detecting plates. Furthermore, the air heated by the temperature detecting plate may be blown by a fan so as to heat the secondary batteries.

Figure 10:
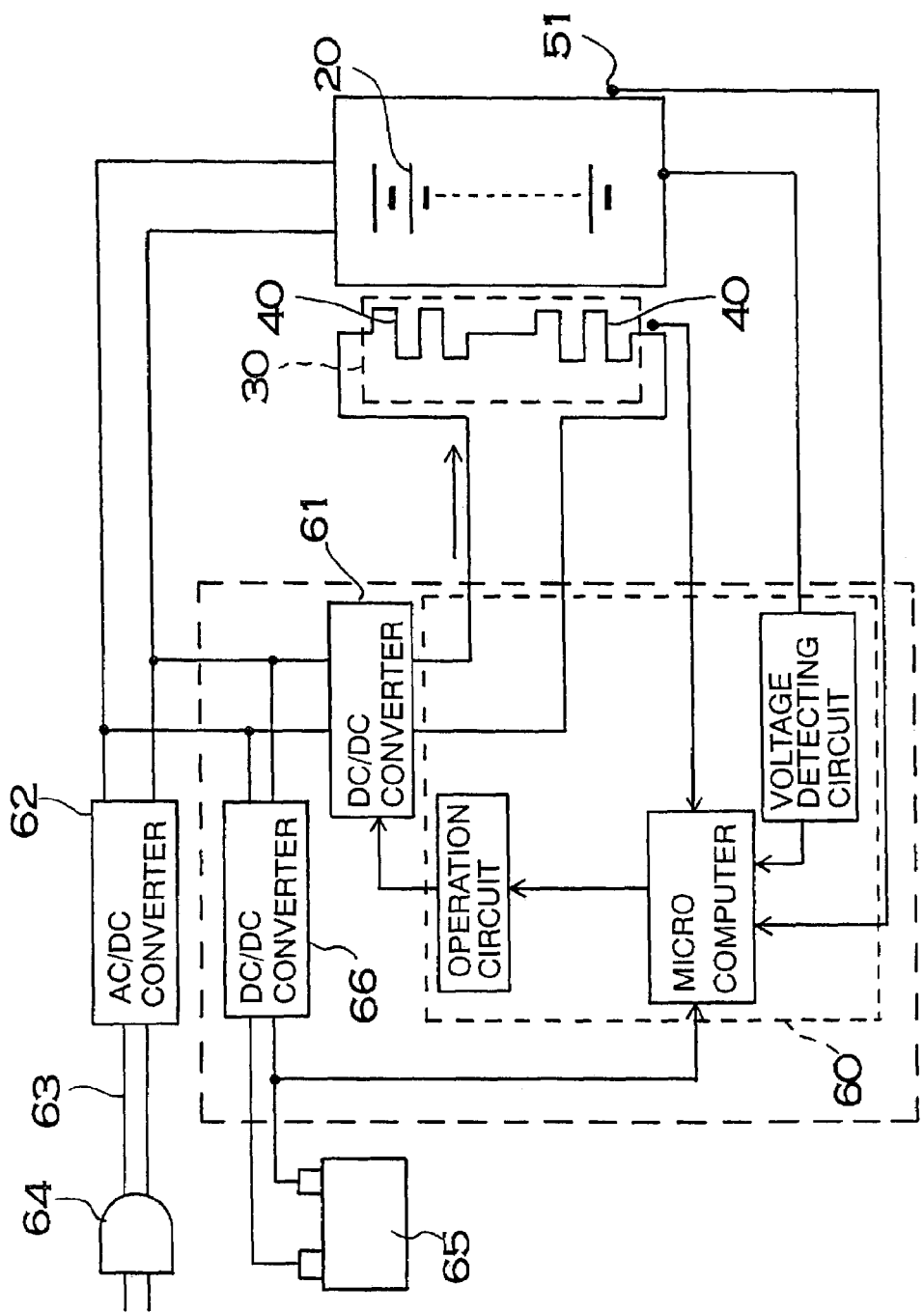
FIG. 10 is a block diagram of a battery apparatus of one embodiment of the present invention.

FIG. 10 shows a block diagram of a battery apparatus. This battery apparatus includes a DC/DC converter 61 for heating the temperature detecting plate 30 by the plurality of secondary batteries 20, and a control circuit 60 for controlling the DC/DC converter 61 to switch ON/OFF of energization of the heaters 40. The DC/DC converter 61 converts output of the plurality of second batteries connected in serial into a predetermined voltage to energize the heaters 40 on the temperature detecting plate 30. This battery apparatus is able to heat the second batteries 20 rapidly with the highest efficiency. This attributes to the fact that the secondary batteries 20 are heated by both of the heat generation by discharging and the heaters 40 of the temperature detecting plate 30.

In the illustrated battery apparatus, at the input side of the DC/DC converter 61 is connected an AC/DC converter 62 for converting AC input to an output voltage of the plurality of secondary batteries 20. The AC/DC converter 62 is connected to a household commercial power source via a lead wire 63 and a plug 64. This battery apparatus is able to heat the heaters 40 using an externally inputted AC input. This is because the AC input can be converted to a direct current at the AC/DC converter 62, and the DC power can be supplied to the heaters 40 by the DC/DC converter 61. The DC/DC converter 61 can also use its output voltage as an output voltage for a battery 65 for electric component in order to charge the battery 65 for electric component. The illustrated battery apparatus includes a special DC/DC converter 66 for charging the battery 65 for electric component. In the case where the battery apparatus uses the DC/DC converter 61 for charging the battery 65 for electric component as well, it is possible to omit the DC/DC converter 66 for charging the battery 65 for electric component.

The control circuit 60 detects the temperature and switches ON/OFF of energization of the heaters 40. The control circuit 60 includes a temperature sensor 51 for detecting the temperature of the battery or the outside air temperature. This temperature sensor 51 is implemented, for example, by a thermister. A thermister detects the ambient temperature on the basis of a change in resistance value to input it to the control circuit 60. When the temperature detected by the temperature sensor 51 is lower than a preset temperature, the control circuit 60 energizes the heaters 40 to heat the secondary batteries 20. The control circuit 60 detects the temperature of the battery or the outside air temperature when an ignition switch of an automobile is turned ON, and if the detected temperature is lower than a preset temperature, it energizes the heaters 40. In the condition that the ignition switch is OFF, or in other words, the automobile is not intended to run, the heaters 40 are not energized even if the temperature of the secondary battery 20 or the outside air temperature is lower than the preset temperature. This is because if the heaters 40 are energized in this condition, the secondary battery 20 may become over discharge. In addition, even in the condition that the ignition switch is turned ON, when the remaining capacity of the secondary batteries 20 is smaller than a preset capacity, the heaters 40 are not energized even at temperatures lower than the preset temperature. This serves to prevent over discharge of the secondary batteries 20. When secondary battery 20 is charged and the remaining capacity exceeds the preset capacity, the heaters 40 are energized if the temperature is lower than the preset temperature. When the secondary battery is charged so that the remaining capacity is larger than the preset capacity, the secondary battery will not become over discharge even if the heaters are energized. And therefore, when the temperature of the secondary battery becomes lower than the preset temperature in the condition that the remaining capacity is larger than the preset capacity, it is possible to energize the heaters in the condition that the ignition switch is OFF. Then the temperature sensor 51 detects that the heaters 40 are energized, and the temperature of the secondary battery 20 exceeds the preset temperature, and the control circuit 60 stops energizing the heaters 40.

Figure 11:
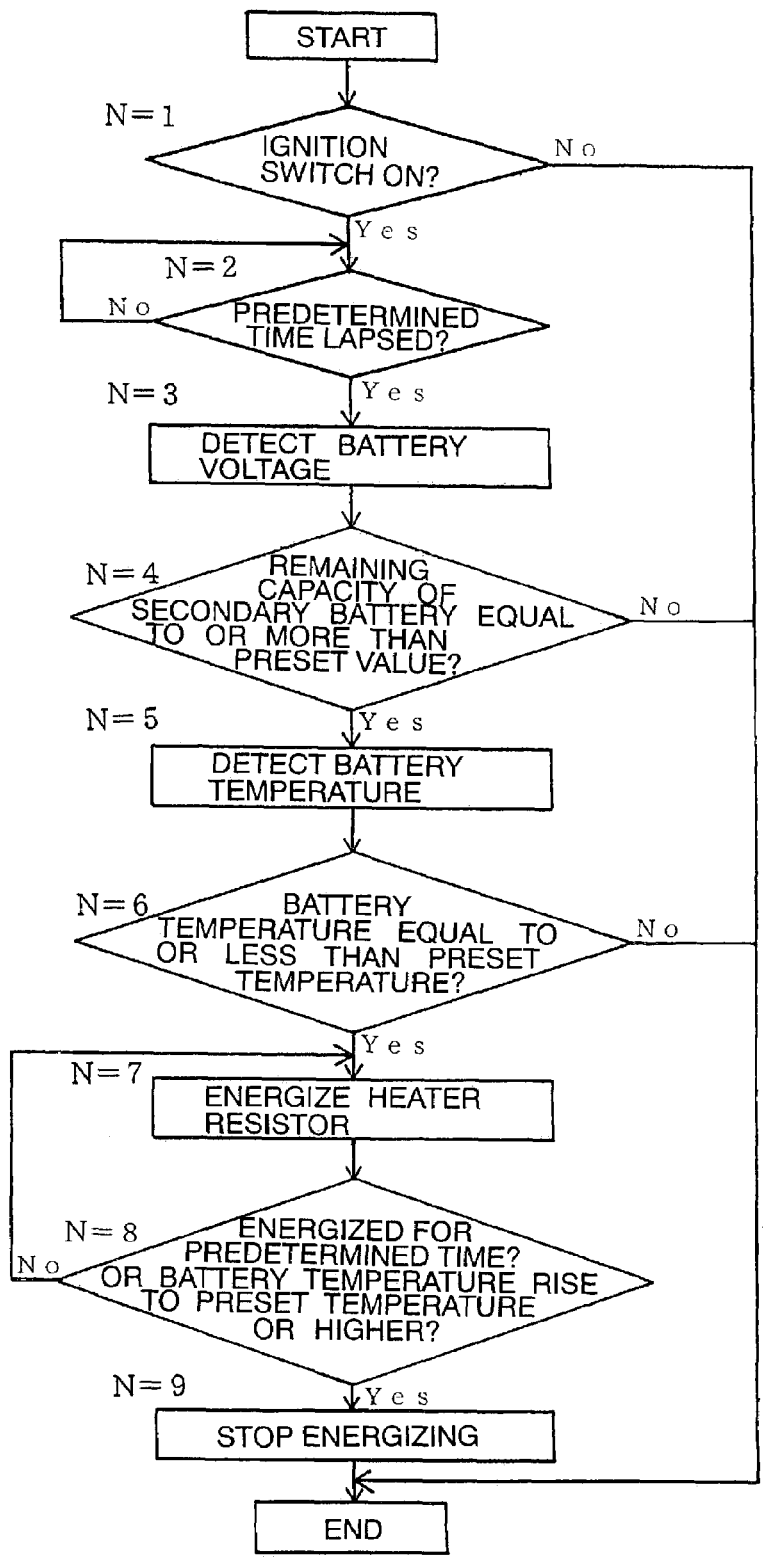
FIG. 11 is a flow chart showing the process of heating secondary batteries by the battery apparatus of the present invention.

The battery apparatus described above heats the secondary batteries in accordance with the flow chart shown in FIG. 11 and described below.

[Step of N=1]

Detect whether the ignition switch of an automobile is switched to ON. The heaters 40 are not energized in the condition that the ignition switch is OFF, namely in the condition that the automobile is not intended to run.

[Step of N=2]

After the ignition switch of the automobile is switched to ON, whether a predetermined time has lapsed is checked. This step is looped until the predetermined time has lapsed.

[Step of N=3, 4]

The control circuit 60 detects voltage of the battery apparatus. The control circuit 6 detects voltage of the secondary batteries 20 connected in serial, and determines a remaining capacity of the secondary batteries 20 in accordance with the voltage thus detected. When the detected voltage is less than a preset voltage, it is determined that the remaining capacity of the secondary batteries 20 is less than the preset value and the heaters 40 are not energized.

The control circuit may calculate the remaining capacity from the detected voltage, and compare the calculated remaining with the preset value.

[Step of N=5, 6]

The control circuit 60 detects the temperature of the battery by means of the temperature sensor 51. Alternatively, the control circuit 60 may detects the outside air temperature. The control circuit 60 determines whether the detecting temperature is lower than the preset temperature, and does not energize the heaters 40 when the detected temperature is higher than the preset temperature.

Furthermore, the control circuit can determine whether or not the heater should be energized by detecting the temperature of the heater instead of the temperature of the battery and comparing the detected temperature with the preset temperature. When the temperature of the heater is higher than the preset temperature, the heater is not energized.

[Step of N=7, 8, 9]

The control circuit 60 energizes the heaters 40 to heat the secondary batteries 20. The control circuit 60 energizes the heaters 40 for a predetermined time or energizes the heaters 40 until the battery temperature becomes higher than a preset temperature. The control circuit 60 stops energizing the heaters 40 when a predetermine time of energization has lapsed or the battery temperature becomes higher than the preset temperature.

Since the battery apparatus described above energizes the heaters 40 in the condition that the ignition switch is turned ON, it is possible to effectively prevent over discharge of the secondary batteries 20. It is to be noted that the battery apparatus of the type that converts AC input to direct current by means of the AC/DC converter 62 can heat the secondary batteries 20 by connecting to the AC power source via the plug 64 of the AC/DC converter 62 even in the condition that the ignition switch is OFF. This is because the heaters 40 can be energized by AC power without discharging the secondary batteries 20. In the present battery apparatus, even in the condition that the ignition switch is OFF, when the battery temperature or the outside air temperature is lower than the preset temperature, the control circuit 60 energizes the heaters 40 to heat the secondary batteries 20. This battery apparatus can be advantageously used particularly in extremely cold areas. This is because when the ignition switch is turned ON to cause the automobile to run, the secondary batteries 20 that have already warmed are able to exert sufficient performance. Also arises an advantage that overcooling of the secondary batteries 20 can be prevented even in the OFF state of the ignition switch.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A battery apparatus for a vehicle, the battery apparatus comprising:
   a plurality of secondary batteries;
   a casing accommodating the secondary batteries;
   a plurality of temperature sensors for detecting temperatures of the secondary batteries accommodated in the casing; and
   a temperature detecting plate fixed outside the casing, the temperature sensors being connected to the temperature detecting plate,
   wherein the casing includes ventilation holes, disposed between the secondary battery and the temperature detecting plate, for cooling the secondary batteries in the casing, and
   the temperature detecting plate includes an insulation substrate and the temperature sensors are fixed to the insulation substrate, the insulation substrate having air holes communicating with the ventilation holes of the casing, and a communicating portions are defined between the air holes, and the temperature sensors are fixed to the communicating portions, thereby allowing each of the temperature sensors to access a surface of at least one of the secondary batteries via the ventilation holes of the casing.

2. The battery apparatus for a vehicle according to claim 1, wherein a battery module made up of a plurality of secondary batteries connected in series is accommodated in the casing.

3. The battery apparatus for vehicle according to claim 2, wherein at least one of the ventilation holes and at least one of the air holes are formed so as to open in parallel with the battery module accommodated in the casing.

4. The battery apparatus for a vehicle according to claim 2, wherein the communicating portions of the temperature detecting plate are disposed so as to be opposed to the secondary batteries of the battery module, and a temperature of one of the secondary batteries is detected by one of the temperature sensors disposed on the respective communicating portion.

5. The battery apparatus for a vehicle according to claim 2, wherein the communicating portion of the temperature detecting plate is disposed at a secondary battery connecting portion of the battery module, and temperatures of two secondary batteries are detected by one temperature sensor disposed at the communicating portion.

6. The battery apparatus for a vehicle according to claim 2, wherein each of the secondary batteries of the battery module is a cylindrical battery.

7. The battery apparatus for a vehicle according to claim 2, wherein each of the secondary batteries of the battery module is a nickel-hydrogen battery.

8. The battery apparatus for a vehicle according to claim 2, wherein a plurality of battery modules are accommodated in the casing so as to be parallel with each other on the same plane.

9. The battery apparatus for a vehicle according to claim 2, wherein the casing includes a first casing portion and a second casing portion, the battery module is disposed in a guiding groove formed in the first casing portion and the second casing portion, the battery module is disposed between the first casing portion and the second casing portion, and the first casing portion defines the ventilation holes that communicate with the air holes of the temperature detecting plate.

10. The battery apparatus for a vehicle according to claim 9, wherein an air-blowing space for permitting air passage between an inner surface of the guiding groove and a surface of the battery module is formed, and the ventilation holes are defined in the first casing portion and the second casing portion.

11. The battery apparatus for a vehicle according to claim 1, wherein the temperature detecting plate is fixed to a top surface of the casing.

12. The battery apparatus for a vehicle according to claim 1, wherein the temperature detecting plate is fixed to a bottom surface of the casing.

13. The battery apparatus for a vehicle according to claim 1, wherein the temperature sensor is provided so as to protrude from the insulation substrate and is disposed in close proximity to at least one of the secondary batteries accommodated in the casing via one of the ventilation holes.

14. The battery apparatus for a vehicle according to claim 1, wherein the ventilation holes and the air holes are located so as to open in the same position.

15. The battery apparatus for a vehicle according to claim 1, wherein the ventilation holes and the air holes have slit-like shapes.

16. The battery apparatus for a vehicle according to claim 1, wherein the temperature detecting plate includes a projection for connecting its circumference to the casing so as to be fixed thereto, and the casing includes a latch hook for latching the projection and one of the communicating portions of the temperature detecting plate.

17. The battery apparatus for a vehicle according to claim 1, wherein the insulation substrate of the temperature detecting plate is a printed substrate.

18. The battery apparatus for a vehicle according to claim 1, further comprising a plurality of heaters for heating the secondary batteries, said heaters being fixed to the temperature detecting plate, and the heaters are energized and heated by Joule heat, and the plurality of secondary batteries are heated by heat generated at the respective heaters.

19. The battery apparatus for a vehicle according to claim 18, wherein the insulation substrate of the temperature detecting plate is a printed substrate, the printed substrate being provided with connecting holes through which lead wires of the heaters are penetrated to be soldered thereto, and the lead wires of the heaters are fixed by soldering to the printed substrate.

20. The battery apparatus for a vehicle according to claim 19, wherein all the heaters fixed to the printed substrate by soldering have the same resistance value.

21. The battery apparatus for a vehicle according to claim 19, wherein a heater is connected in parallel to one of the heaters serially connected with each other.

22. The battery apparatus for a vehicle according to claim 19, wherein the heater and a jumper cable are connected to at least one of the connecting holes.

23. The battery apparatus for a vehicle according to claim 18, wherein the plurality of secondary batteries are connected in series, and the battery apparatus further comprises a DC/DC converter for converting output of the serially connected secondary batteries to a predetermined voltage, whereby output voltage of the secondary batteries is converted by the DC/DC converter so as to energize a heater resistor.

24. The battery apparatus for a vehicle according to claim 23, wherein the output voltage of the DC/DC converter is a charge voltage of a battery for an electric component.

25. The battery apparatus for a vehicle according to claim 18, further comprising a control circuit for switching ON/OFF energization of the heaters, the control circuit including a temperature sensor for detecting the battery temperature or the outside air temperature and operating so that the control circuit energizes the heaters when the temperature detected by the temperature sensor is lower than a preset temperature.

* * * * *